United States Patent [19]

Trauernicht

[11] Patent Number: 5,629,968

[45] Date of Patent: May 13, 1997

[54] APPARATUS AND METHOD FOR OBTAINING TWO RADIOGRAPHIC IMAGES OF AN OBJECT FROM ONE EXPOSING RADIATION DOSE

[75] Inventor: David P. Trauernicht, Rochester, N.Y.

[73] Assignee: Eastman Kodak Company, Rochester, N.Y.

[21] Appl. No.: 440,052

[22] Filed: May 12, 1995

[51] Int. Cl.$^6$ ........................................................ H05G 1/64
[52] U.S. Cl. ........................................... 378/98.8; 378/176
[58] Field of Search ................................... 250/582, 584, 250/585; 378/98, 98.3, 98.8, 98.11, 98.12, 189, 190, 176

[56] References Cited

U.S. PATENT DOCUMENTS

| | | | |
|---|---|---|---|
| 4,179,100 | 12/1979 | Sashin et al. | 378/98.8 |
| 4,439,866 | 3/1984 | Kato et al. | 250/583 |
| 4,503,460 | 3/1985 | Sklebitz . | |
| 4,736,397 | 4/1988 | Velasquez | 378/98.3 |
| 5,012,096 | 4/1991 | Takeda et al. | 250/384 |
| 5,138,167 | 8/1992 | Barnes | 378/156 |
| 5,182,624 | 1/1993 | Tran et al. | 257/40 |
| 5,221,843 | 6/1993 | Alvarez | 378/185 |
| 5,235,195 | 8/1993 | Tran et al. . | |
| 5,254,480 | 10/1993 | Tran | 250/270 |
| 5,262,649 | 11/1993 | Antonuk et al. | 250/370.09 |
| 5,273,910 | 12/1993 | Tran et al. | 437/3 |
| 5,276,329 | 1/1994 | Hughes | 250/370 |
| 5,313,066 | 5/1994 | Lee et al. | 250/370.09 |
| 5,315,631 | 5/1994 | Hillen et al. | 378/98.8 |

FOREIGN PATENT DOCUMENTS

| | | |
|---|---|---|
| 0574689A2 | 12/1993 | European Pat. Off. . |
| 0574690A2 | 12/1993 | European Pat. Off. . |
| 0618719A1 | 10/1994 | European Pat. Off. . |

OTHER PUBLICATIONS

Kato, "Photostimulable Phosphor Radiography Design Considerations" in *Medical Physics Monograph No. 20: Specification, Acceptance Testing and Quality Control of Diagnostic X–Ray Imaging Equipment*, 1991, American Institute of Physics, pp. 731–769.

Antonuk, et al., "A High Resolution, High Frame Rate, Flat–Panel TFT Array for Digital X–Ray Imaging" in *SPIE Physics of Medical Imaging*, 1994, vol. 2163, pp. 118–128.

Schiebel et al. "Fluoroscopic X–Ray Imaging with Amorphous Silicon Thin–Film Arrays" in *SPIE Physics of Medical Imaging*, 1994, vol. 2163, pp. 129–140.

Zhao et al., "A Large Area Solid–State Detector for Radiology Using Amorphous Selenium," *Medical Imaging VI: Instrumentation*, SPIE vol. 1651, 1992, pp. 134–142.

Trueblood et al., "Radiographic Film Digitization" in *Monograph No. 22: Digital Imaging*, AAPM 1993 Summer School Proceedings, pp. 99–122.

Floyd, "Posterior Beam–Stop Method for Scatter Fraction Measurement in Digital Radiography," *Invest. Radiol.*, 1992, vol. 27, pp. 119–123.

*Primary Examiner*—Don Wong
*Attorney, Agent, or Firm*—William F. Noval

[57] ABSTRACT

In accordance with the invention, an apparatus for diagnostic radiographic imaging comprises an x-ray source for providing an exposing dose of x-rays and a first radiation receptor for detecting imagewise modulated x-rays are emitted from the x-ray source and from an imaging object interposed between the source and the first receptor; the first receptor thereby provides a first image of the object. A second radiation receptor for detecting imagewise modulated x-rays that are emitted from the first receptor is situated behind the first receptor and comprises x-ray converter means and detector means for detecting a converted x-ray image; the second receptor provides a digital second image of the object. Also in accordance with the invention, a method for forming two diagnostic radiographic images from a dose of x-rays comprises exposing an imaging object interposed between an x-ray source and a first radiation receptor and detecting by the first receptor imagewise modulated x-rays emitted from the x-ray source and the object; a first image of the object is thereby provided. Imagewise modulated x-rays emitted from the first receptor are detected by a second imaging receptor that is situated behind the first receptor and comprises x-ray converter means and detector means for detecting a converted x-ray image; a digital second image of the object is thereby provided.

16 Claims, 2 Drawing Sheets

5,629,968

APPARATUS AND METHOD FOR OBTAINING TWO RADIOGRAPHIC IMAGES OF AN OBJECT FROM ONE EXPOSING RADIATION DOSE

FIELD OF THE INVENTION

This invention relates to radiographic imaging and more particularly to an apparatus and method for obtaining two radiographic images of a subject from one exposing dose of radiation.

BACKGROUND OF THE INVENTION

The primary diagnostic radiographic imaging technology in current use combines a radiographic film with one or two intensifying screens. In a screen-film system, the film, generally placed between two phosphor screens, is exposed by the image forming radiation, then developed to provide a display image. This image can be viewed directly or digitized in a film digitizer that can be further processed, viewed on a monitor, or printed.

Another useful x-ray imaging technology utilizes a photostimulable storage phosphor on which the image is formed by the exposing radiation. This image is read out by a laser scanner, which produces an array of digital data that can be displayed on a monitor, subjected to further processing, or printed.

More recently, thin-film transistor (TFT) technology, involving the use of a pixel array of radiation sensors and associated field effect transistors, has been investigated for application to x-ray imaging. Although this technology currently suffers from some limitations of image resolution and display area, it has the significant advantage over screen-film and storage phosphor systems of providing an x-ray image with nearly real-time response.

PROBLEM TO BE SOLVED BY THE INVENTION

The throughput of high resolution radiographic images obtained either from screen/film or storage phosphor systems is limited by the substantial post-exposure processing times required by both of these technologies before the image is available for viewing: for development of the film and possible image digitization in the case of screen-film, for subsequent laser scanning and digitization of the storage phosphor image. It would be highly useful to have an image, possibly of lower resolution but viewable practically immediately after exposure for preliminary examination and possible decision-making before the higher resolution image from screen/film or storage phosphor is available. The present invention provides this benefit.

SUMMARY OF THE INVENTION

In accordance with the invention, an apparatus for diagnostic radiographic imaging comprises an x-ray source for providing an exposing dose of x-rays and a first radiation receptor for detecting imagewise modulated x-rays emitted from the x-ray source and from an imaging object interposed between the source and the first receptor; the first receptor thereby provides a first image of the object. A second radiation receptor for detecting imagewise modulated x-rays that are emitted from the first receptor is situated behind the first receptor and comprises x-ray converter means and detector means for detecting a converted x-ray image; the second receptor provides a digital second image of the object.

Also in accordance with the invention, a method for forming two diagnostic radiographic images from a dose of x-rays comprises exposing an imaging object interposed between an x-ray source and a first radiation receptor and detecting by the first receptor imagewise modulated x-rays emitted from the x-ray source and the object; a first image of the object is thereby provided. Imagewise modulated x-rays emitted from the first receptor are detected by a second imaging receptor that is situated behind the first receptor and comprises x-ray converter means and detector means for detecting a converted x-ray image; a digital second image of the object is thereby provided.

ADVANTAGEOUS EFFECT OF THE INVENTION

The present invention provides two useful radiographic images of a subject from a single exposing dose of radiation: a first image of high resolution and a second image of possibly lower resolution but available for viewing in near real-time. As a further advantage of the invention, these images may be combined to provide a composite image of improved quality relative to its two components.

DETAILED DESCRIPTION OF THE INVENTION

Figure 1:
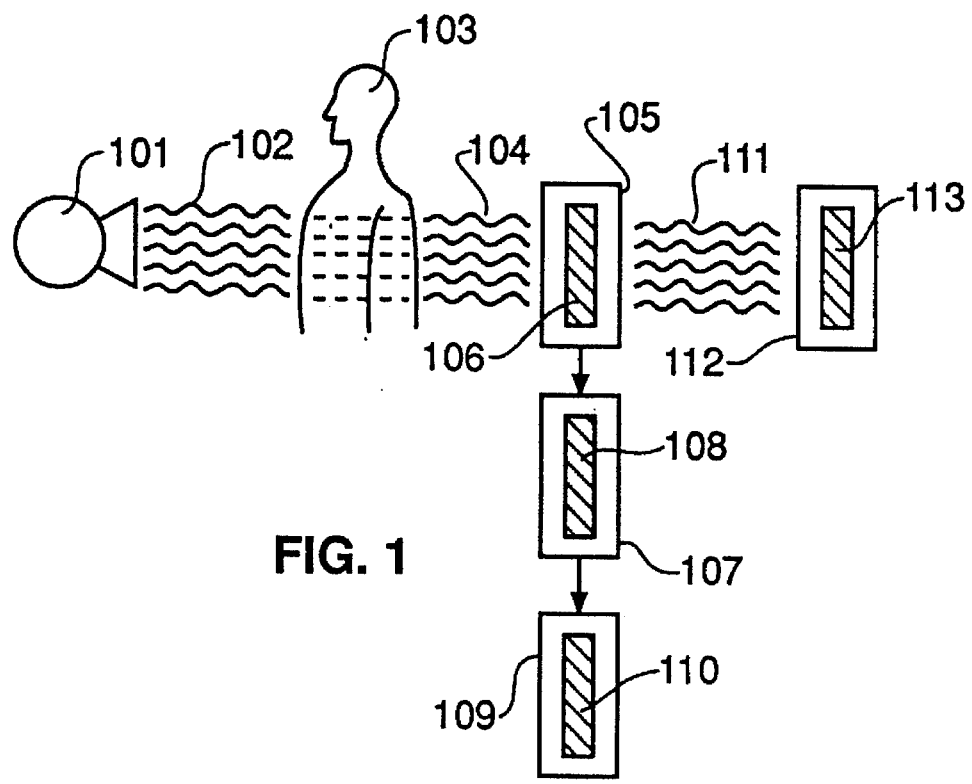
FIG. 1 is a schematic representation of the apparatus and method of the invention where the first radiation receptor comprises a screen-film combination.

In one embodiment of the present invention, the first radiation receptor comprises a radiographic film-intensifying screen combination. Diagnostic radiographic images typically produced by screen-film systems of objects situated within a human body include, for example, dental and cranial radiograms, mammograms, pelvic and skeletal radiograms, and radiograms of the thoracic region, commonly referred to as "chest x-rays." X-ray dosages required to provide a detailed image can vary greatly, depending on whether the imaging object is, for example, primarily bone or soft tissue. A radiogram frequently includes regions of widely varying penetrability by x-rays; chest x-rays, for example, include the relatively translucent lungs and the denser mediastinal, retrocardiac, and subdiaphramatic regions. To obtain radiographic images of good quality from such a variety of objects within a human body, it is desirable to select optional combinations of radiographic films and intensifying screens for the intended purpose. A wide range of commercially available screen-film combinations are described, for example, in a monograph by A. G. Haus and R. E. Dickerson entitled "Characteristics of KODAK Screen-Film Combinations for Conventional Medical Radiography," 1993, published by Eastman Kodak Company, the disclosures of which are incorporated herein by reference.

Digital x-ray imaging technology, including procedures such as magnetic resonance imaging and computed tomography, is finding increasing use for diagnostic radiography. In another embodiment of the present invention, the first radiation receptor comprises a photostimulable storage phosphor. The storage phosphor is employed as a sensor to detect the x-ray image, and a laser scanner is used to read out the image, that is, convert the resulting luminescence to a digital electronic signal. Following digitization, the imaging information on the storage phosphor may be erased by light, leaving the phosphor available for reuse.

The storage sensor and laser scanner comprise a radiographic imaging system referred to as computed radiography. The sensor and the scanner are constructed so that their combination produces optimal results for the intended diagnostic application. Digital radiography based on photostimulable storage phosphors is discussed in "Photostimulable Phosphor Radiography Design Considerations", by S. Kato, pages 731–769 in *Medical Physics Monograph No. 20: Specification, Acceptance Testing and Quality Control of Diagnostic X-Ray Imaging Equipment*, 1991, American Institute of Physics, the disclosures of which are incorporated herein by reference.

In accordance with the present invention, the second radiation receptor, which provides a digital second image of the object from the exposing dose of x-rays, comprises x-ray converter means and detector means for detecting a converted x-ray image. In a preferred embodiment the detector means comprises a thin-film transistor (TFT) array. A TFT array may include a large number of photosensitive pixels each comprising a sensor and an associated field effect transistor. As described in Antonuk et at., U.S. Pat. No. 5,262,649, and in Antonuk et al., "A High Resolution, High Frame Rate, Flat-Panel TFT Array for Digital X-Ray Imaging" in *SPIE Physics of Medical Imaging*, 1994, vol. 2163, pages 118–128, the disclosures of which are incorporated herein by reference, the sensors and transistors in the thin-film transistor array of the second radiation receptor may comprise hydrogenated amorphous silicon or polycrystalline silicon. Cadmium selenide may also be utilized for the sensors and transistors of the array.

As x-ray converter means one may employ, for example, a scintillating phosphor, a channeled light converter, or a fiber-optic scintillator. Useful scintillating materials for this purpose include, for example, $Gd_2O_2S:Tb$ and $CsI:Tl$, as disclosed in Hughes, U.S. Pat. No. 5,276,329, and in Schiebel et al., "Fluoroscopic X-Ray Imaging with Amorphous Silicon Thin-Film Arrays" in *SPIE Physics of Medical Imaging*, 1994, vol. 2163, pages 129–140, the disclosures of which are incorporated herein by reference.

A TFT array may also comprise a plurality of collection electrode pixels containing transistors, together with a photoconductive layer as x-ray converter means. For example, amorphous selenium may be employed as a photoconductor with field-effect transistors comprising cadmium selenide, as described in Zhao et al., "A Large Area Solid-State Detector for Radiology Using Amorphous Selenium" in *Medical Imaging VI: Instrumentation*, SPIE vol. 1651, 1992, pages 134–142, the disclosures of which are incorporated herein by reference.

Hydrogenated amorphous silicon, polycrystalline silicon, and amorphous selenium are also employed in the solid-state thin-film transistor radiation detectors described in the patents of Tran, U.S. Pat. Nos. 5,254,480, 5,182,624, 5,235, 195, and 5,273,910, the disclosures of which are incorporated herein by reference.

Also useful as second radiation imaging receptors in the apparatus of the present invention are x-ray image capture elements such as those described in Lee et al., U.S. Pat. No. 5,313,066 and in European Patent Application Nos. 574689 and 574690, the disclosures of which are incorporated herein by reference. In these elements, the field effect transistors of the array are separated by diodes connected to minute conductive electrodes, or microplates. Each of these microplates, together with an intermediate dielectric photoconductive layer and a conductive backing layer form two microcapacitors in series that capture a latent radiographic image upon exposure to image-modulated x-rays. Read out of the stored electrical signals produces, in accordance with the present invention, a second image of the object.

In accordance with the present invention, the second radiation receptor may also include x-ray converter means comprising an image intensifier with an optic coupling device and detector means comprising a semiconductor image sensor, as described in Sklebitz, U.S. Pat. No. 4,503, 460, and in European Patent Application No. 618719, the disclosures of which are incorporated herein by reference.

FIG. 1 schematically depicts an embodiment of the present invention in which the first radiation receptor is a screen-film combination. From an x-ray source 101 is emitted an exposing dose 102 of x-rays, which irradiates an imaging object 103. Imagewise modulated x-rays 104 from the source and object are detected by a screen-film first radiation receptor 105, thereby providing a first image 106. Developer apparatus 107 converts this latent first image to developed first image 108, which may be converted by a film digitizer 109 to a digital first image 110, which may be displayed on a monitor (not shown), subjected to further processing, or printed. Digitization of a film image is described in Trueblood et al., "Radiographic Film Digitization," pages 99–122 in *Monograph No. 22: Digital Imaging*, AAPM 1993 Summer School Proceedings, the disclosures of which are incorporated herein by reference.

Imagewise modulated x-rays 111 emitted from the first radiation receptor 105 are detected by a second radiation receptor 112, which comprises x-ray converter means and detector means and is situated behind the first receptor. Detection of imagewise modulated rays 111 by receptor 112 provides a digital second image 113. This second image may be displayed on a monitor, compared or combined with digital first image 110, or printed.

Figure 2:
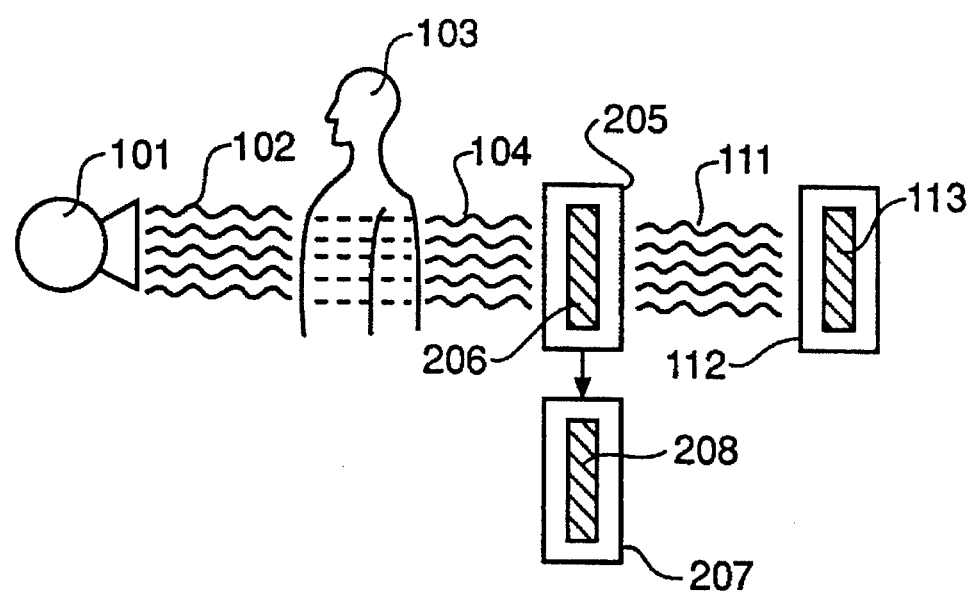
FIG. 2 is a schematic representation of the apparatus and method of the invention where the first radiation receptor comprises a photostimulable storage phosphor.

FIG. 2 is a schematic representation of an embodiment of the invention in which the first radiation receptor is a photostimulable storage phosphor. In this embodiment of the invention, imagewise modulated x-rays 104 from the source 101 and the object 103 are detected by a storage phosphor radiation receptor 205, thereby providing a first image 206. This stored first image can be converted by laser scanner 207 to a digital first image 208, which may be displayed on a monitor, further processed, or printed.

In the same way as described for FIG. 1, imagewise modulated x-rays emitted from the first radiation receptor 205 are detected by the second receptor 112 and subsequently converted to the digital second image 113, which may be displayed, compared or combined with digital first image 208, or printed.

Also in accordance with the present invention, the apparatus may further comprise an x-ray beam stop device interposed between the first and second radiation receptors. Inclusion of a beam stop in the apparatus provides a second image of the object that is useful as a scatter detector. The use of a beam stop to measure radiation scatter is discussed in Floyd, "Posterior Beam Stop Method for Scatter Fraction Measurement in Digital Radiography," *Invest. Radiol.*, 1992 vol. 27, pages 119–123, the disclosures of which are incorporated herein by reference.

When a patient or object is exposed to a dose of x-rays, some amount of the radiation is scattered. This scattered radiation contains very little image information, but its detection by the first radiation receptor results in degradation of the first image. Determination of the amount of the image signal that is caused by radiation scatter would permit processing of the digital first image to remove the deleterious effects of the scatter, thereby improving the quality of the first image.

Figure 3:
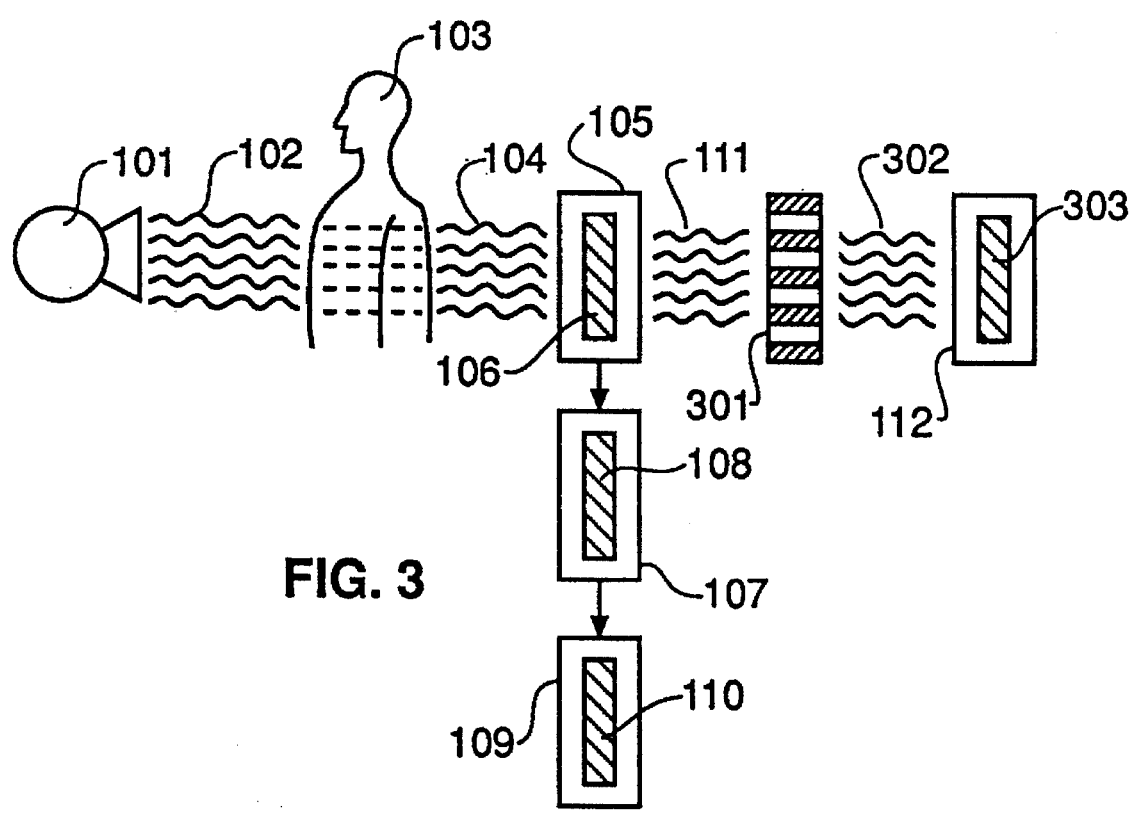
FIG. 3 is a schematic representation of the apparatus further comprising an x-ray beam stop device.

FIG. 3 schematically depicts the operation of the apparatus of the invention that includes a screen-film as the first radiation receptor (of course, a storage phosphor could also be used) and further comprises a beam stop device. The beam stop 301, which is a grid or an array of strips formed of lead or other heavy metal, is positioned between the first radiation receptor 105 and the second receptor 112. The beam stop absorbs the primary unscattered radiation contained in the x-rays 111 emitted from the first receptor, allowing only the scattered radiation fraction 302 to be detected by the second receptor. The resulting digital second image 303 is useful as a scatter detector; it may be combined with first digital image 110 to remove the effect of radiation scattering, thereby enhancing the quality of the primary image. Utilizing the second image obtained from an exposing dose of x-rays as a scatter detector rather than as a primary diagnostic image lessens the resolution capability requirements of a TFT array detector.

Having the information contained in a radiographic image available in digital form is highly desirable because it enables various types of manipulation, adjustment of tone scale for example, to enhance the visibility of features in the image. Digitizing the radiographic information in the first image obtained by screen-film or storage phosphor systems is time consuming, causing delays between exposure and viewing and limiting the number of radiographic diagnoses that can be performed in a given time period. The second image is almost immediately available from the second radiation receptor, and even though expected to be of lower resolution than the image eventually obtainable from the screen-film or storage phosphor systems, it is of adequate quality to begin the process of determining tone scale and segmenting the image into background and features of interest. When the digital first image becomes available, it can be compared with the already available digital second image in a few corresponding areas, enabling the mapping of data needed for viewing and/or printing of the image. A substantial reduction in the elapsed time between x-ray exposure and image viewing is thereby achieved.

If the digital first and second images are of similar resolution, and if the pixels comprising each of the images are of approximately the same dimensions, the two images may be combined in registration to provide a composite image of enhanced quality relative to that of the two components.

Combining the first and second images obtained in accordance with the invention from a single exposing dose of x-rays is particularly advantageous where the first radiation receptor is a photostimulable storage phosphor. A storage phosphor system typically comprises a single screen, in contrast to the two intensifying screens generally included in a screen-film system. Under such circumstances, it would be expected that a higher dose of x-rays is required to attain a given level of radiation detection in a single-screen storage phosphor system compared with a dual screen-film system. To compensate for this difference, two storage phosphor screens could be stacked within a cassette, but this would necessitate time-consuming scanning of both screens. However the second digital image provided by a TFT array employed as a second radiation receptor in the apparatus of this invention may be beneficially combined with the digital first image provided by the storage phosphor to produce a radiographic image of improved quality relative to either of the component images alone.

The invention has been described in detail with particular reference to certain preferred embodiments thereof, but it will be understood that variations and modifications can be effected within the spirit and scope of the invention.

Parts List 101 x-ray source
102 exposing x-ray dose
103 imaging object
104 imagewise modulated x-rays
105 screen-film radiation receptor
106 first image
107 developer apparatus
108 developed first image
109 film digitizer
110 digital first image
111 imagewise modulated x-rays
112 second radiation receptor
113 digital second image
205 storage phosphor radiation receptor
206 first image
207 laser scanner
208 digital first image
301 beam stop
302 scattered radiation
303 digital scatter-detecting image

What is claimed is:

1. An apparatus for diagnostic radiographic imaging, said apparatus comprising:

(a) a stationary x-ray source for providing a two dimensional area exposing dose of x-rays, thereby irradiating a stationary imaging object;

(b) a first x-ray radiation large area receptor for detecting two dimensional imagewise modulated x-rays from said exposing dose emitted from said x-ray source and from said imaging object, said object being interposed between said source and said first receptor, said first receptor thereby providing a first image of said object from said exposing dose; and (c) a second x-ray radiation large area receptor for detecting two dimensional imagewise modulated x-rays from said exposing dose emitted from said first receptor, said second receptor being situated behind said first receptor and comprising x-ray converter means and detector means for detecting a converted x-ray image, said second receptor thereby providing a digital second image of said object from said exposing dose;

wherein said x-ray converter means comprises a scintillating phosphor, a channeled light converter, or a fiber-optic scintillator, and said detector means comprises a thin-film transistor (TFT) array.

2. The apparatus of claim 1 wherein said thin-film transistor array comprises a plurality of photosensitive pixels comprising sensors and field effect transistors associated therewith.

3. The apparatus of claim 2 wherein said sensors and said transistors consist hydrogenated amorphous silicon, polycrystalline silicon, or cadmium selenide.

4. An apparatus for diagnostic radiographic imaging, said apparatus comprising:

(a) a stationary x-ray source for providing a two dimensional area exposing dose of x-rays, thereby irradiating a stationary imaging object;

(b) a first x-ray radiation large area receptor for detecting two dimensional imagewise modulated x-rays from said exposing dose emitted from said x-ray source and from said imaging object, said object being interposed between said source and said first receptor, said first receptor thereby providing a first image of said object from said exposing dose; and (c) a second x-ray radiation large area receptor for detecting two dimensional imagewise modulated x-rays from said exposing dose emitted from said first receptor, said second receptor being situated behind said first receptor and comprising x-ray converter means and detector means for detecting a converted x-ray image, said second receptor thereby providing a digital second image of said object from said exposing dose;

wherein said x-ray converter means comprises a photoconductive layer and said detector means comprises a thin-film transistor (TFT) array.

5. The apparatus of claim 4 wherein said photoconductive layer comprises amorphous selenium.

6. The apparatus of claim 4 wherein said thin-film transistor array comprises a plurality of collection electrode pixels and field effect transistors associated therewith.

7. The apparatus of claim 6 wherein said transistors comprise hydrogenated amorphous silicon, polycrystalline silicon, or cadmium selenide.

8. An apparatus for diagnostic radiographic imaging, said apparatus comprising:

(a) a stationary x-ray source for providing a two dimensional area exposing dose of x-rays, thereby irradiating a stationary imaging object;

(b) a first x-ray radiation large area receptor for detecting two dimensional imagewise modulated x-rays from said exposing dose emitted from said x-ray source and from said imaging object, said object being interposed between said source and said first receptor, said first receptor thereby providing a first image of said object from said exposing dose; and (c) a second x-ray radiation large area receptor for detecting two dimensional imagewise modulated x-rays from said exposing dose emitted from said first receptor, said second receptor being situated behind said first receptor and comprising x-ray converter means and detector means for detecting a converted x-ray image, said second receptor thereby providing a digital second image of said object from said exposing dose;

wherein said x-ray converter means comprises an image intensifier and an optic coupling device, and said detector means comprises a semiconductor image sensor.

9. A method for forming two radiographic x-ray images of an imaging object from an exposing dose of x-rays, said method comprising:

(a) exposing a stationary imaging object to a two dimensional area exposing dose of x-rays from an x-ray source, said imaging object being interposed between said x-ray source and a first x-ray radiation large area receptor;

(b) detecting by said first receptor two dimensional imagewise modulated x-rays from said exposing dose emitted from said x-ray source and from said imaging object, thereby providing a first image of said object; and (c) detecting by a second x-ray radiation large area receptor two dimensional imagewise modulated x-rays from said exposing dose emitted from said first receptor, said second receptor being situated behind said first receptor and comprising x-ray converter means and detector means for detecting a converted x-ray image, thereby providing a second digital image of said object;

wherein said x-ray converter means comprises a scintillating phosphor, a channeled light detector, or a fiber-optic scintillator, and said detector means comprises a thin-film transistor (TFT) array.

10. The method of claim 9 wherein said thin-film transistor array comprises a plurality of photosensitive pixels comprising sensors and field effect transistors associated therewith.

11. The method of claim 10 wherein said sensors and said transistors consist hydrogenated amorphous silicon, polycrystalline silicon, or cadmium selenide.

12. The method of claim 9 wherein x-rays from said exposing dose emitted from said first receptor encounter an x-ray beam stop interposed between said first and said second receptor, whereby said digital second image in said second receptor comprises a scatter detector.

13. A method for forming two radiographic x-ray images of an imaging object from an exposing dose of x-rays, said method comprising:

(a) exposing a stationary imaging object to a two dimensional area exposing dose of x-rays from an x-ray source, said imaging object being interposed between said x-ray source and a first x-ray radiation large area receptor;

(b) detecting by said first receptor two dimensional imagewise modulated x-rays from said exposing dose emitted from said x-ray source and from said imaging object, thereby providing a first image of said object; and (c) detecting by a second x-ray radiation large area receptor two dimensional imagewise modulated x-rays from said exposing dose emitted from said first receptor, said second receptor being situated behind said first receptor and comprising x-ray converter means and detector means for detecting a converted x-ray image, thereby providing a second digital image of said object;

wherein said x-ray converter means comprises a photoconductive layer and said detector means comprises a thin-film transistor (TFT) array.

14. The method of claim 13 wherein said photoconductive layer comprises amorphous selenium.

15. The method of claim 13 wherein said thin-film transistor array comprises a plurality of collection electrode pixels and field effect transistors associated therewith.

16. A method for forming two radiographic x-ray images of an imaging object from an exposing dose of x-rays, said method comprising:

(a) exposing a stationary imaging object to a two dimensional area exposing dose of x-rays from an x-ray source, said imaging object being interposed between said x-ray source and a first x-ray radiation large area receptor;

(b) detecting by said first receptor two dimensional imagewise modulated x-rays from said exposing dose emitted from said x-ray source and from said imaging object, thereby providing a first image of said object; and (c) detecting by a second x-ray radiation large area receptor two dimensional imagewise modulated x-rays from said exposing dose emitted from said first receptor, said second receptor being situated behind said first receptor and comprising x-ray converter means and detector means for detecting a converted x-ray image, thereby providing a second digital image of said object;

wherein said x-ray converter means comprises an image intensifier and an optic coupling device, and said detector means comprises a semiconductor image sensor.

* * * * *